United States Patent [19]

Bohlayer et al.

[11] Patent Number: 4,940,675
[45] Date of Patent: Jul. 10, 1990

[54] METHOD FOR MAKING LOW-EXPANSION GLASS ARTICLE OF COMPLEX SHAPE

[75] Inventors: Julie A. Bohlayer, Horseheads; Gordon F. Foster, Campbell; Robert D. Shoup, Corning, all of N.Y.

[73] Assignee: Corning Incorporated, Corning, N.Y.

[21] Appl. No.: 207,968

[22] Filed: Jun. 17, 1988

[51] Int. Cl.⁵ .......................... C03C 1/00; C03C 3/00
[52] U.S. Cl. ...................................................... 501/12
[58] Field of Search ........................................... 501/12

[56] References Cited

U.S. PATENT DOCUMENTS

| | | | |
|---|---|---|---|
| 2,272,342 | 2/1942 | Hyde | 49/78.1 |
| 2,326,059 | 8/1943 | Nordberg | 100/52 |
| 3,678,144 | 7/1972 | Shoup | 264/42 |

Primary Examiner—Mark L. Bell
Assistant Examiner—David M. Brunsman
Attorney, Agent, or Firm—Kees van der Sterre

[57] ABSTRACT

Silica glass articles of complex shape are provided by a gel machining process wherein a silicate solution is first cast into a mold of simple shape and gelled to a fully crosslinked wet gel body, and the wet gel body is thereafter removed from the mold and machined by grinding, drilling, core drilling, water jet cutting or the like to provide a wet gelled shape of the complex configuration desired. The complex wet gel shape is then dried and consolidated, with no change in configuration (except for shrinkage), to provide a unitary crack-free glass article retaining the shape of the machined gel.

21 Claims, 1 Drawing Sheet

METHOD FOR MAKING LOW-EXPANSION GLASS ARTICLE OF COMPLEX SHAPE

BACKGROUND OF THE INVENTION

The government has rights in this invention under contract number F19628-85-C-0048 awarded by the U.S. Air Force.

Fused silica or quartz glasses are well known for certain physical characteristics rendering them unique among glasses. For example, such glasses demonstrate excellent refractoriness, enabling them to be used at very high temperatures. They also exhibit chemical inertness, especially to acids. Finally, they possess a very low coefficient of thermal expansion, i.e., in the range of about 5–10 $\times 10^{-7}/°C$. over the temperature range of 0-300 °C. This latter property of low thermal expansion renders the glasses particularly valuable for the fabrication of optical components wherein precise dimensions must be retained by the structure over a rather broad temperature regime.

Fused silicia products are presently formed by the fusion of slip-cast preforms, by the fusion of deposits produced through the flame oxidation of silicon-containing source compounds, or by melting silica batch materials at very high temperatures, e.g., 2000° C. or above. As can be appreciated, the geometry and dimensions of shapes produced by these methods are somewhat limited and, in addition, the physical properties of the glasses may vary depending on the source of raw materials. Thus vitreous silica of very high purity is of the highest utility for the manufacture of technical products since property variations due to impurities are largely avoided.

Much of the present commercial production of high-purity vitreous silica and high-silica glass is by the flame oxidation of source compounds such as silicon tetrachloride. U.S. Pat. No. 2,272,342 provides a general description of the manufacture of pure fused silica products by this method. Again, as the disclosure of that patent suggests, the shape of products which can be formed through this method is quite limited and the cost of manufacture for products of complex configuration is therefore quite high. Ordinarily, the manufacture of complex structures in pure fused silica by this process requires that the glass boules originally deposited by flame oxidation be cut into plates or other shapes and thereafter fusion-bonded to form more complicated structures.

U.S. Pat. No. 2,326,059 describes a flame oxidation process for glass manufacture which is closely related to that of the above patent, but which produces a high-silica glass having an average coefficient of thermal expansion even lower than that of fused silica. The patent describes depositing a $TiC_2$-$SiO_2$ glass using a flame oxidation process as for fused silica, but using a mixture of $TiCl_4$ and $SiCl_4$ source compounds to provide a deposited glass wherein the $TiO_2$ content is about 5–11% by weight. This glass has an average linear coefficient of thermal expansion of less than about $5 \times 10^{-7}/°C.$, but again, requires cutting and shaping to provide products of complex shape.

Because of these various fabrication difficulties there is still a substantial demand for a method for preparing fused silica articles of high purity at relatively low cost and in essentially unlimited shapes. One approach which has been developed to solve this problem, described in U.S. Pat. No. 3,678,144, involves the so-called sol-gel process. In that process, aqueous silicate solutions comprising dissolved alkali silicate compounds, colloidal silica, and/or quaternary ammonium silicate compounds are caused to gel in a controlled fashion to produce a semisolid silicate gel which can be further processed to provide high-silica glass. The process generally involves adding to the silicate suspension, which is stable at pH values above about 10-11, a gelling agent which is effective to gradually reduce the pH of the solution. This effects a destabilization of the solution and causes the precipitation of silica therefrom. The silica precipitate forms a silica gel in the liquid medium which can be of very fine and uniform pore size.

The silica gel produced as described can be processed to remove alkali from the pore structure if desired, and can thereafter be dried and consolidated into a dense silica glass product. While obviously considerable shrinkage is involved in converting the gelled solution to solid glass, the shrinkage is reproducible and thus products having shapes reproducible by casting can be provided by this approach from these solutions.

Following the development of the sol-gel method described in U.S. Pat. No. 3,678,144, various gel approaches to the production of silicate glasses containing oxides in addition to $SiO_2$ were proposed. U.S. Pat. No. 3,678,144, for example, further teaches that soluble metal compounds dissolved in the silicate solution may be precipitated with the silica during the gelation process and provide additional components in the resulting porous or consolidated glasses. U.S. Pat. No. 4,112,032 teaches that particulate additions of oxides or other compounds can be made to the silicate solution, and these additives can be trapped in the pore structure of the gel following precipitation and drying to a porous product. And copending commonly assigned patent application Ser. No. 055,632, filed May 29, 1987 by R. D. Shoup, teaches that low expansion $TiO_2$-$SiO_2$ glasses can be made from silicate gels comprising suitable colloidal suspensions of $TiO_2$.

As has been recognized in these and other patents and literature relating to the production of silicate glasses by gel techniques, a recurring problem in the art is cracking of the gelling or gelled shape due to the fragility of the cast material in the course of gelling and during early post-gel drying. The gelling process in silicate solutions first produces a gradual increase in solution viscosity, with the solution eventually becoming semisolid and capable of transmitting stress. Thereafter, as crosslinking of the silicates continues, significant shrinkage of the semi-solid gel occurs, accompanied by rising stress in the gel due to adhering contact with the rigid walls of the mold. It is at this stage that cracking of the wet gel readily occurs, because the strength of the material is very low. Unfortunately, since cracks in the gel cannot be repaired, the cracked piece must be discarded.

This problem is particularly difficult in the case of castings of complex shape. An example of such a shape would be an "egg crate" structure formed by a plurality of upright intersecting planar segments forming an open-ended cell array, wherein the planar segments form the walls of the cells. Such structures are useful, for example, as backing supports in the fabrication of lightweight glass mirrors because of their high rigidity and relatively low mass.

While the use of non-adhering molds or mold coatings can in many cases alleviate the risk of cracking in standard castings, such procedures are not sufficient for the near-net-shape casting of complex shapes. This is because the large mold surface areas typically involved in such casting significantly increase stresses on the casting despite the use of release coatings.

It is therefore an object of the present invention to provide a method for making glass articles of complex shape from silicate solutions which avoids or minimizes the problem of gel cracking prevalent with prior art methods.

It is a further object of the invention to provide a method for making glass articles from silicate solutions which facilitates the manufacture of glass shapes not manufacturable by normal casting or near-net-shape casting methods.

Other objects and advantages of the invention will become apparent from the following description thereof.

SUMMARY OF THE INVENTION

In accordance with the present invention, a solution to the problem of molding "egg crate" or other complex or difficult shapes in glass is provided by a method which comprises the step of wet gel or so-called "green state" machining. In this procedure, a selected complex shape is machined from a gel blank which has a relatively simple and/or high-strength configuration, with machining being efficiently and rapidly carried out while the gel is in the wet and relatively soft green state.

Wet gel machining largely overcomes the cracking problem associated with the manufacture of glass articles of complicated shape from gels. By gelling a preform for the desired article in a simple mold, either as a simple solid shape or as a shape wherein excess thickness is present at restricted points in the casting, mold surface area and thus the mold adherence stresses arising therefrom are minimized. Therefore the risk of gel cracking from the stresses of shrinkage is proportionately reduced. After gelation has proceeded to the point of higher gel strength, a desired complex shape can conveniently be provided by a suitable machining technique. Examples of suitable techniques include procedures such as core drilling, water jet cutting, ultrasonic cutting, and wire sawing.

Broadly stated, then, the invention includes a process for providing a glass article of complex shape from a silicate gel which comprises the initial steps of casting a silicate solution into a mold and thereafter gelling the solution to provide an integral wet gelled shape. In general, this wet gelled shape will be gelled to an extent sufficient to provide a self-supporting gelled body having the configuration of the mold (except for shrinkage), and being sufficiently strong to be removed therefrom.

Following the gelling step, the wet gelled shape is machined to remove gel material from selected sections thereof, thus to provide a machined gel having a shape corresponding to the complex shape selected for the glass article. With proper gelation of the solution and the use of appropriate machining techniques, the wet gel may be shaped to the desired configuration without cracking or other damage from the machining step.

Finally, the machined wet gel is dried and consolidated to provide a glass article having the shape (except for drying and consolidation shrinkage) of the machined gel. These steps may be carried out in the manner conventional for silicate gels of complex configuration.

The described method is useful not only for the production of glass articles of complex overall shape, but also for providing minor modifications to simple shapes such block structures wherein, due to the final configuration required, the final shape cannot be achieved by near net shape casting. Thus, for example, the wet gel may be machined to provide holes, undercut surface figures, or other difficult-to-cast features which are desired to be incorporated in the final product.

DESCRIPTION OF THE DRAWING

The invention may be further understood by reference to the drawing, wherein.

DETAILED DESCRIPTION

Figure 1:
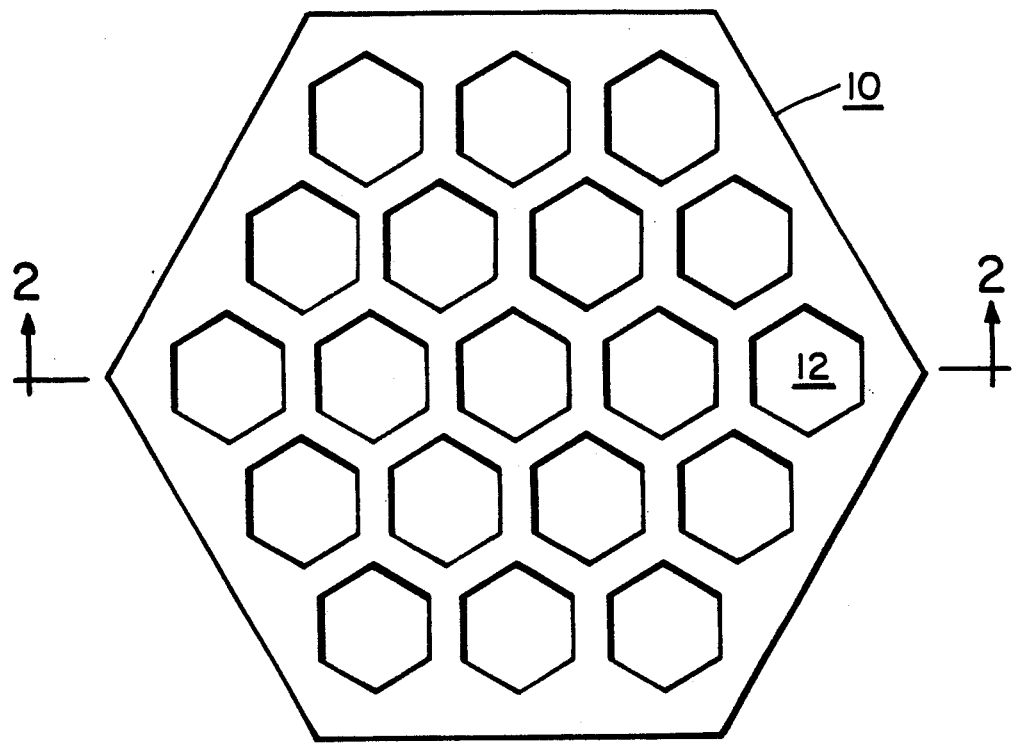
FIG. 1 is a schematic plan view, not in true proportion or to scale, of an example of a complex glass structure provided in accordance with the invention.

Silicate solutions useful for the manufacture of glass articles in accordance with the invention include known silicate solutions such as described in U.S. Pat. Nos. 3,678,144 and 4,059,658. Also included are variations upon those solutions described in subsequent patents and literature for the production of fused silica and silicate glasses containing other oxides. Typically, these are true solutions comprising silicates, although colloidal suspensions of silica or of silicate compounds are also useful, particularly in combination with the solutions. Since silica itself is essentially insoluble in water, the silica in these solutions and/or suspensions is normally present in the form of a dissolved or suspended alkali metal silicate or organic ammonium silicate such as a quaternary ammonium silicate compound.

In order to maintain the silica in a dissolved or suspended colloidal state in such solutions, the concentration of alkali metal and/or ammonium ion must be sufficient to yield pH values greater than about 10 for ammonium silicates, and greater than about 11 for alkali silicates. Further, to secure gelation characteristics suitable for providing a first homogeneous gel, the silica content of these solutions or colloids should be maintained in the range of about 1–12 moles/liter, more preferably 3–12 moles/liter.

Silicate solutions and/or colloidal suspensions of these types which may be used to provide the solutions to be treated in accordance with the invention may be purchased commercially or else formulated of commercially available or conventional soluble silicate compositions. A typical potassium silicate solution of the commercially available type generally comprises about 8.3% $K_2O$, 20.8% $SiO_2$, and the remainder water by weight. A typical colloidal silica suspension will comprise about 40 wt. % $SiO_2$ with the balance $H_2O$.

The incorporation of other oxides in these solutions is achieved in the known manner through the addition of solutions or suspensions of the other oxides, or compounds thereof, to the extent compatible with the silicate solutions. Particularly useful are additions of $TiO_2$, which as reported in the aforementioned copending, commonly assigned patent application, can be achieved using aqueous colloidal $TiO_2$ suspensions (sols) stabilized at alkaline pH and free of precipitated $TiO_2$ particles. In general, titania sols having pH values in the range of at least 9 and titania concentrations in the range of 0.5–3 moles/liter can be used for this purpose, with the preferred sols comprising quaternary ammonium counter ions to stabilize the sols at the desired pH. Particularly preferred are tetrapropyl and tetrabutyl ammonium counter ions.

Casting of the silicate solutions in accordance with the process of the invention is carried out utilizing conventional procedures and equipment, but simplified by the fact that the molds and castings are normally of relatively simple configuration. However, although the risk of cracking is reduced in simple castings formed in low surface area molds, it is preferable to continue to use non-adhering mold materials or at least mold coatings, such as wax or fluorocarbon-plastic-coated molds, for the forming process.

Gelation of silicate solutions or suspensions can be induced through the use of gelling agents which are conventional for the treatment of soluble silicate solutions, these agents being added to the silicate solution either before or after the solution has been cast. The gelling agents are normally compounds which uniformly dissolve in the silicate solutions, and which react slowly and uniformly therewith to reduce the pH of the solution through the neutralization of alkali and/or ammonium ion present therein. The result is that silica slowly and uniformly precipitates from and polymerizes within the liquid phase.

Included among the various compounds suitable for promoting gelation in these systems are formaldehyde, paraformaldehyde, formamide, glyoxal, methyl formate, methyl acetate, ethyl formate and ethyl acetate. The rate of gelation typically depends upon the amount of gelling agent introduced into the suspension, as well as on the composition of the gelling agent selected, but useful ranges of addition can readily be determined by routine experiment.

An alternative to the use of the above-described gelling agents, especially in the case of solutions containing additions such as colloidal $TiO_2$, is self-induced gelation. This reaction is generally useful in cases where the final solution/suspension is slightly unstable due to the particular combination of constituents employed. Self-gelation can be sufficiently slow that casting prior to gelation is easy, yet rapid enough so that complete gelation will occur within 16–24 hours.

The gelling of the silicate solutions may be carried out over a broad temperature range, extending from near the freezing temperature to the boiling temperature of the solution. More rapid gelation will occur as temperatures above ambient are used to accelerate the polymerization process, but excessive heating of the solution is usually avoided in order to avoid differential polymerization rates and/or the generation of gas bubbles or other defects in the evolving gel. Gelation is considered to be completed at the point at which the pH of the solution is reduced to a value below about 11 for alkali silicate solutions, or to about 7–10 for ammonium silicate solutions.

The pore sizes in the gelled solutions will vary depending upon factors such as the relative proportion of colloidal $SiO_2$ present in the solution and the rate of gelling, with larger pore sizes being favored by lower proportions of colloidal silica and by slower gelling. For best drying of the gels, pore sizes in excess of 1000 and in the range of about 2000–3000Å are desired. Preferred compositions to achieve these pore sizes are solutions consisting essentially of about 70–90% potassium silicate solution and 10–30% colloidal silica solution by weight.

To minimize the risk of gel cracking it has been found useful to release the gel from the mold at an early stage in the gelling process, most preferably as soon as the gel is sufficiently firm to become separable from the mold without cracking. Advantageously, in the process of the invention, the solid casting can often self-release upon initial shrinkage, especially where non-stick mold materials are employed. Thereafter, further crosslinking and shrinkage can proceed without undue stress as the casting is free-standing in the supernatant liquid.

The machining of the gel is generally undertaken only at the completion of the silica precipitation and cross-linking phases, the gel at this stage having stopped shrinking and being referred to as fully cross-linked. It is at this point sufficiently strong to be self-supporting and somewhat crack-resistant. The precise machining technique employed to shape the wet gel will depend on the composition and strength of the gel, and the extent of reshaping required.

Core drilling or other drilling techniques can be used to provide holes over a wide range of diameters in wet gel blocks, and also to remove material from cast blocks for the purpose of reducing the weight of the final glass product or preform. Water jet and ultrasonic cutting are useful for the removal of material and for general surface figuring, while wire sawing can be used where straight cuts are needed. Also, Blanchard or other grinding techniques can remove material and provide surface shaping of wet gel preforms. In all cases, it is desirable to avoid undue evaporation from the wet gel so that drying stresses do not develop and so that the semisolid consistency of the material is maintained. This may include the periodic rewetting of the gel with an aqueous medium to compensate for evaporation loss.

It is in many cases desirable, following the gelation and machining of the wet gel, to subject the gel to a leaching step for the purpose of removing excess quantities of alkali metal ions from the silicate structure. This is necessary where high-silica or relatively pure doped silica glasses are required.

Leaching is generally carried out with weakly acidic solutions having pH values greater than about 4. Leaching solutions which are conventional for the treatment of alkali silicate gels can be used, a typical example of such a solution being aqueous ammonium nitrate, at a concentration of about 1 molar or below.

Leaching in these gel systems is diffusion limited and the rate of leaching can be accelerated by increasing the temperature of the system. However, if the pH of the gel is decreased too rapidly, nonuniform leaching and differential condensation of the gel can result, leading to radial cracking of the gel body.

After the machined gel has been treated for a time sufficient to reduce the alkali level to a sufficiently low value, the gel is dried to remove water and other vaporizable constituents such as vehicle components and/or organic reagents from the pore structure thereof. Preliminary drying can be accomplished by simply allowing the semisolid gel to stand in the ambient environment, although forced air drying at 50–100 °C. or microwave heating greatly speeds drying. Overly rapid drying should be avoided however, as this can lead to the occurrence of cracking in the structure.

After loosely-held water and organic reagents are removed from the machined body by ambient drying, the gel is normally subjected to a further drying or pre-firing treatment to remove bound water and residual vaporizable constituents. Temperatures above about 1000 °C are suitable for this purpose, with a preferred temperature range being about 1000–1100 °C. If desired, this step may be carried out in the presence of a low concentration (1–5% by volume) of chlorine as an aid to the removal of water and, in some cases, residual metallic impurities such as iron and the alkali and alkaline earth metals.

Heating at temperatures above 1100 °C. during pre-firing should not be used, to avoid premature pore closure in the dried gel. Heating times of one hour or more at these temperatures is normally sufficient to substantially remove bound water and organics from the pore structure.

In carrying out this pre-firing treatment, relatively slow heating of the porous body is employed to guard against overly rapid removal of residual water from the pore structure. If fast heating is employed, cracking of the porous body can readily occur. The preferred practice is to heat the porous body at a rate not exceeding about 300 °C./hr to the peak drying temperature employed. Following this treatment, the porous dried gel may be cooled to room temperature and examined for cracks or other defects, if desired.

The machined dried gel produced as described is finally consolidated to transparent, homogeneous glass by further firing. Consolidation can be carried out conveniently at temperatures in the range of about 1350°–1700°C. within time periods of 0.5–4 hours, depending upon the size of the article. As in the case of drying, heating of the article to consolidation temperatures should be relatively uniform, since different consolidation rates can result in shape distortion and/or cracking.

To insure full consolidation and the absence of any entrapped seeds or bubbles in the glass, it may be desirable to carry out the consolidation process in an atmosphere of high diffusibility, such as helium. Consolidation at reduced atmospheric pressure or in a vacuum may also be useful for this purpose. In this way, complete pore closure is encouraged and the entrapment of residual seeds in the glass is minimized.

The invention may be further understood by reference to the following detailed examples, which are intended to be illustrative rather than limiting.

EXAMPLE 1

A silicate solution for the manufacture of a fused silica glass blank is prepared by first adding 6620 cc of a potassium silicate solution, commercially available as Kasil 1 solution from the PQ Corporation of Philadelphia, PA, to 716 cc of a colloidal silica sol commercially available as Ludox HS-40 sol from I. E. Dupont de Nemours of Wilmington, DE, with strong agitation during the addition step. Agitation is continued until any particles formed during the addition have redissolved.

A gelling agent solution comprising 812 cc of formamide in 1400 cc of water is then added to the silicate solution with continued stirring to achieve homogeneity. The resulting mixture is then cast into a wax-coated metal mold to provide a casting approximately 37 cm square and 7.6 cm in thickness.

The cast mixture is allowed to gel in the mold at room temperature for approximately 5 days, this interval being sufficient to obtain nearly complete gelation of the solution. Thereafter, the mold is covered and then heated to approximately 95 °C to complete the polymerization and shrinkage of the silica gel structure.

The wet gel blank thus provided is then removed from the mold for machining. To produce flat parallel surfaces on the casting it is first ground on a Blanchard grinder. Thereafter, the blank is machined by core drilling utilizing a vibratory diamond-faced steel drill bit about 7.6 cm long and 1 cm in diameter. Multiple hexagonal cutouts are machined through the wet gel block, each hexagonal cutout having a point-to-point diameter of about 5.1 cm. The minimum wall thickness between cutouts in the resulting cutout array is about 0.63 cm.

Finally, the outside of the blank is trimmed to a hexagon shape, with the final hexagonal structure having a point-to-point diameter of about 33 cm and a thickness of about 6.3 cm. Throughout the course of these machining operations, the gel structure is kept wet so that excessive drying will not cause cracking.

The machined wet gel thus provided is next treated with a series of heated solutions for dealkalization, including several rinses in 0.5 molar $NH_4NO_3$ solution, several rinses in 1 molar HCL, and several rinses in distilled water. The immersion time in each solution is 16 hours, all solutions being maintained at temperatures in the range of about 70–90 °C. Thereafter the wet gel is preliminarily dried in a microwave oven for approximately 4 hours at a moderate power level of approximately 500 watts. The resulting dried gel is free of cracks and has a pore size of approximately 2400 Å.

The consolidation of the machined gel to a nonporous glass article is accomplished in two steps. The gel is first further dried or pre-fired in air to a temperature of about 1000 °C. to displace bound water and organics, and to achieve a moderate improvement in body strength. Thereafter the dried gel body is rapidly heated in helium (using a heating rate of about 30–50 °C. per minute) to 1720 °C., and then held for about 30 minutes at that temperature to complete the consolidation process.

The resultant integral, nonporous glass article, which shows a linear shrinkage of about 50% from the dimensions of the original casting, faithfully retains the configuration machined into the gel during the wet gel machining operations. Thus the glass article is of hexagonal shape, having a diameter of about 16.2 cm (across points), a thickness of about 2.8 cm, hexagonal cells about 2.5 cm in diameter, and a minimum wall thickness between cells of about 0.3 cm. This configuration renders the glass article particularly suitable for use as a core or backer element for a lightweight glass mirror blank.

FIG. 1 of the drawing schematically illustrates the configuration of a typical nonporous consolidated glass article produced in accordance with the above-described procedure. In FIG. 1, glass article 10 is shown in plan view to illustrate a plurality of hexagonal cutouts, exemplified by hexagonal cutout 12, in the surface of the article. In accordance with the invention the cutouts had originally been machined into the glass while still in the condition of a wet gel body.

Figure 2:
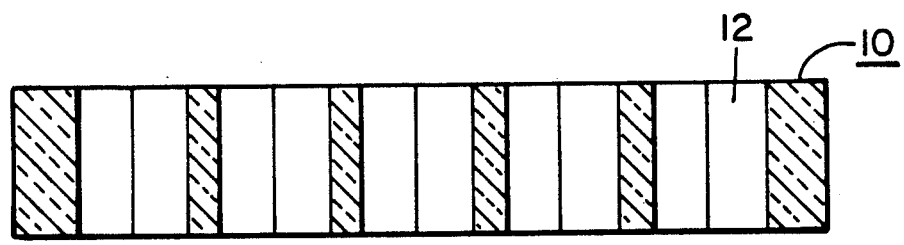
FIG. 2 is a schematic cross-sectional elevational view of the glass structure of FIG. 1.

In FIG. 2 of the drawing, which is an elevational view of the glass article of FIG. 1 taken in cross-section along line 2—2 of FIG. 1, the extension of the hexagonal cutouts 12 through the entire cross-section of the glass article 10 is shown. This imparts light weight to the article while still enabling it to retain a high level of strength and rigidity.

The physical and thermal properties of the consolidated glass closely approximate those of Corning Code 7940 glass, which is a highly pure fused silica made by a vapor deposition process and previously used for the fabrication of glass core elements of similar configuration.

EXAMPLE 2

The solution casting and gelation procedure of Example 1 above is repeated except that the composition of the solution is modified. The solution is prepared by mixing 6198 cc of Kasil 1 potassium silicate solution with 1509 cc of Ludox HS-40 colloidal silica suspension, and thereafter adding thereto a gelling agent solution consisting of 860 cc of a formamide gelling agent in 974 cc of water. When cast into a mold as in Example 1, this solution produced a gel blank about 37 cm square by 7.6 cm in thickness, after gelation and final silica crosslinking and polymerization following the procedure of Example 1. This gel composition ultimately provides a dry gel with a somewhat smaller average pore size than the composition of Example 1.

To machine the wet gel casting thus provided, the casting is first removed from the mold and Blanchard-ground to insure flat and parallel opposing faces. Next, starter holes for an array of hexagonal cutouts are drilled in one face of the casting, the layout of the array being substantially the same as in Example 1. For this purpose, a template for the cutout array is used and one starter hole approximately 1.3–1.9 cm in depth is drilled for each cutout, using a steel drill of 0.63 in diameter.

After the starter holes have been provided, the cutouts are machined in the casting using a water jet cutter, with cutting for each hexagonal cutout being initiated at the starter hole. Thereafter, the edges of the wet machined gel body are trimmed, by sawing, to achieve the same general shape as the machined casting of Example 1, with the size of the holes, remaining wall thickness, and overall core dimensions being approximately the same as in that Example.

The machined gel casting is next dealkalized and dried following the procedure of Example 1, the dried gel having an average pore size of about 1500 Å. Finally, the dried porous body is consolidated to a glass of full density as described in Example 1. The resulting fused silica body or "core" retains the shape of the wet machined casting despite an overall linear shrinkage of about 50%.

EXAMPLE 3

A silicate solution for a large cross-section gel blank is prepared by mixing 15,676 cc of Kasil 1 potassium silicate solution with 1697 cc of Ludox HS-40 colloidal silica suspension. Thereafter, a gelling agent solution consisting of 1923 cc of formamide mixed with 3303 cc of water is added to the silicate solution and the resulting mixture is cast into a mold such as used in Example 1, but to a depth of about 15.2 cm. Thus a casting about 37 cm square by about 15.2 cm thick is provided.

Following the procedure of Example 1, the cast solution is next gelled and crosslinked, the semisolid wet gel is removed from the mold and faced by Blanchard grinding, and the shaped wet gel is then machined by ultrasonic core drilling as described in that Example. Core drilling is again accomplished utilizing the 7.6 cm diamond drill bit, with through-cutting of the casting being achieved by drilling in one side, then flipping the casting over and drilling the remainder of the hole from the other face. Due to the soft nature of the wet porous gel, this is readily done with good precision.

The remaining process of dealkalization, drying and consolidation to dense fused silica glass is accomplished following the procedure of Example 1, and again the hexagonal glass product faithfully retains the configuration of the machined wet gel. The final product has a diameter of about 15.2 cm, a thickness of about 7.6 cm, and a maximum wall thickness between cutouts of about 0.63 cm.

EXAMPLE 4

Following the procedure of Example 1, a gel blank is provided and machined to substantially the same outer dimensions as therein described, but with the wall thickness between hexagonal cutouts being reduced by 50% to about 0.315 cm. The resulting machined piece was thereafter successfully dried and consolidated to provide an integral silica glass core with a wall final thickness of about 0.2 cm. Equivalent results are also achieved using water jet cutting instead of ultrasonic drilling for the machining step.

EXAMPLE 5

A wet silica gel blank is provided and prepared for core drilling in accordance with the procedure of Example No. 1. However, in the machining step, ultrasonic core drilling as in Example 1 is used only to cut blind hexagonal holes in one surface of the wet gel blank. Thus, instead of through-cutting with drill, the drilling is stopped about 1 cm short of penetration through the blank. The product of this machining process is an integral wet gel "core and faceplate" structure of a configuration suitable for use as a mirror blank.

After dealkalization, drying, and consolidation at a peak temperature of 1720° C for 10 minutes, a crack-free consolidated fused silica structure is provided which retains the original machined geometry of the wet gel. Utilizing this approach, the extensive grinding and polishing presently used to fabricate large, low expansion, lightweight optical mirror systems could be substantially reduced.

EXAMPLE 6

Glass products having designs not suitable for forming by direct gel casting may also be provided in accordance with the invention. Solid cubes comprising drilled holes may be provided by casting the silicate solution of Example 1 into cube or rectangular bar molds and gelling the castings as therein described. The resulting wet gel shapes, cut to smaller dimensions if necessary, may be drilled using a standard steel drill bit to provide cylindrical channels through any desired dimension of the wet gel preforms.

After dealkalization, drying, and consolidation of the machined pieces at 1500 °C., the pieces are found to have been converted to dense nonporous and crack-free glass shapes retaining cylindrical channels showing no distortion or deformation resulting from the drying and consolidation process.

Of course the foregoing description and examples are merely illustrative of the invention, and numerous modifications and variations of the products and procedures specifically described herein may be resorted to within the scope of the appended claims.

We claim:
1. A process for providing a glass article of complex shape which comprises the steps of:

casting a silicate solution into a mold;
gelling the solution in the mold to provide a self-supporting wet gelled shape having the configuration of the mold;
machining the wet gelled shape to remove gel material therefrom, thus to provide a machined gel having a shape corresponding to that of that of the glass article; and
drying and consolidating the machined gel while maintaining the shape thereof to provide the glass article.

2. A process in accordance with claim 1 wherein the silicate solution comprises silica in the form of a dissolved or suspended compound selected from the group consisting of alkali metal silicates and organic ammonium silicates.

3. A process in accordance with claim 2 wherein the organic ammonium silicate compound is a quaternary ammonium silicate compound.

4. A process in accordance with claim 2 wherein the dissolved or suspended compound is present in the silicate solution in a concentration sufficient to yield a pH value greater than about 10 for the solution.

5. A process in accordance with claim 4 wherein the dissolved compound is an alkali silicate compound and wherein said alkali silicate compound is present in a concentration sufficient to yield a pH value greater than about 11.

6. A process in accordance with claim 2 wherein the silica content of the solution is in the range of about 1-12 moles per liter.

7. A process in accordance with claim 6 wherein the silica content of the solution is in the range of about 3-12 moles/liter.

8. A process in accordance with claim 1 wherein the solution further comprises colloidal $TiO_2$.

9. A process in accordance with claim 8 wherein the solution comprising colloidal $TiO_2$ is free of precipitated $TiO_2$ and is provided by combining the silicate solution with an aqueous colloidal $TiO_2$ sol having a pH of at least 9 and a titania concentration in the range of about 0.5-3 moles per liter.

10. A process in accordance with claim 1 wherein the step of gelling the solution in the mold comprises the step of adding to the solution a gelling agent which is effective to reduce the pH of the solution through the neutralization of alkali and/or ammonium ions present therein.

11. A process in accordance with claim 10 wherein the gelling agent is a compound selected from the group consisting of formaldehyde, paraformaldehyde, formamide, glyoxal, methyl formate, methyl acetate, ethyl formate and ethyl acetate.

12. A process in accordance with claim 1 wherein the gelled solution has a pore size in the range of about 1000-3000Å.

13. A process in accordance with claim 1 wherein the mold includes at least a surface coating of a non-adhering material selected from the group consisting of waxes and fluorocarbon plastics.

14. A process in accordance with claim 1 wherein the step of machining the wet gelled shape comprises surface grinding.

15. A process in accordance with claim 1 wherein the step of machining the wet gelled shape comprises hole drilling.

16. A process in accordance with claim 1 wherein the step of machining the wet gelled shape comprises a procedure selected from the group consisting of core drilling, water jet cutting, wire sawing and ultrasonic cutting.

17. A process in accordance with claim 1 wherein the self-supporting wet gelled shape is fully cross-linked prior to the machining step.

18. A process in accordance with claim 1 wherein the step of machining the wet gelled shape comprises the step of rewetting the shape with an aqueous medium to replace lost moisture.

19. A process in accordance with claim 1 wherein, prior to the drying step, the machined gel is leached with a weakly acidic solution to remove alkaline constituents therefrom.

20. A process in accordance with claim 1 wherein, prior to consolidation, the machined gel is dried at a temperature in the range of about 1000-1100 °C. to remove bound water and other vaporizable constituents therefrom.

21. A process in accordance with claim 20 wherein the machined gel is consolidated at a temperature in the range of about 1350°-1700 °C. to provide the glass article.

* * * * *